US007573487B1

(12) United States Patent
Petersen

(10) Patent No.: US 7,573,487 B1
(45) Date of Patent: Aug. 11, 2009

(54) DYNAMICALLY TRANSFORMABLE USER INTERFACE ICONS

(75) Inventor: Scott E. Petersen, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 714 days.

(21) Appl. No.: 10/742,257

(22) Filed: Dec. 19, 2003

(51) Int. Cl.
*G09G 5/00* (2006.01)
*G09G 5/02* (2006.01)

(52) U.S. Cl. .................. 345/629; 345/594; 345/592

(58) Field of Classification Search ........... 345/589, 345/590, 592, 594, 629, 650, 661, 676; 715/764, 715/768, 810, 835, 838, 977
See application file for complete search history.

(56) References Cited

U.S. PATENT DOCUMENTS

| 5,469,536 | A | * | 11/1995 | Blank ................. 345/594 |
| 5,651,107 | A | | 7/1997 | Frank et al. |
| 5,748,789 | A | | 5/1998 | Lee et al. |
| 5,995,671 | A | | 11/1999 | Nagarajan et al. |
| 5,999,191 | A | | 12/1999 | Frank et al. |
| 6,144,388 | A | | 11/2000 | Bornstein |
| 6,177,945 | B1 | * | 1/2001 | Pleyer ................ 345/473 |
| 6,985,149 | B2 | * | 1/2006 | Peercy et al. ........... 345/506 |

OTHER PUBLICATIONS

Ziff-Davis Publishing Company, L.P., "Kai's Power Tools 3.0," MacUser / Mar. 1996, pp. 1-2 of Webpage <http://www.nacuser.com/mu_0396/reviews/review04.html>.

ZDNet PC Magazine, "First Looks Hands-On Reviews of New Shipping Products: Adobe PhotoDeluxe Home Edition 3.0," Dec. 30, 1998, pp. 1-2 of Webpage <http://www.zdnet.com/pcmag/stories/firstlooks/0,6763,379585,00.html>.
PC Alamode Magazine, Kuo Yen Ng, "Adobe PhotoDeluxe 3.0 Home Edition," Nov. 1999, pp. 1-2 of Webpage <http://www.alamopc.org/mag/rev119901.htm>.
Adobe Photoshop 7.0, Dec. 1999, Adobe Pagemaker software, version 7.0, pp. 1-2 and 1-9.

* cited by examiner

*Primary Examiner*—Hau H Nguyen
(74) *Attorney, Agent, or Firm*—Fish & Richardson P.C.

(57) ABSTRACT

Systems and techniques to transform user interface icons. In general, in one implementation, the technique includes: receiving input indicating a change in functional context of a user interface, transforming an icon image based upon the input using a layer of the icon image, the icon image having multiple image layers including a transparency component, and compositing the multiple image layers using the transparency component to form a rendered icon with a changed appearance that reflects the changed functional context of the user interface. Transforming the icon image can involve recoloring a layer of the icon image. Moreover, a software product can include an icon image having multiple pictographic elements distributed among multiple layers, and instructions operable to cause one or more data processing apparatus to perform operations comprising transforming at least one of the layers based upon received input, and rendering the icon image by compositing the layers.

22 Claims, 5 Drawing Sheets

DYNAMICALLY TRANSFORMABLE USER INTERFACE ICONS

BACKGROUND OF THE INVENTION

The present application describes systems and techniques relating to user interfaces, for example, user interface icons that can change in appearance.

An icon in a user interface is typically a raster image or bitmap that represents a software object, such as a system object in an operating system or a tool in a software application (e.g., the icon can form part of a button corresponding to the tool). Traditional icons have included transparency, which allows the icons to include elements of a background color or image, such as can be determined by an operating system (OS) that composites received icon images with an OS specified background.

Additionally, traditional tools in software applications include tools that have state represented by the icons corresponding to the tools. Such representative state has been added to traditional icons explicitly at design time in the case of rollover icons. A traditional rollover icon has multiple associated icon images, one for each state to be represented. When the state of the tool changes, the corresponding icon image is selected to be rendered as the icon, providing the new icon representation of the changed state.

Representative state has also been added to traditional icons at run time in the case of icons that are grayed out when inactive, and icons with a changing color representative of a color state of an associated tool. Traditional changing color icons come in two general forms. In the first, the software simply draws a colored rectangle in an area of the icon to indicate a selected color. In the second type, a simple color substitution is performed in the single icon image corresponding to the icon seen on the screen. This traditional color substitution is a direct substitution of a specific source color value in an icon image with a specific replacement color value. The specific source and replacement color values are typically either full pixel value specifications, such as when a full RGB (Red, Green, Blue) source triplet is replaced with a full RGB replacement triplet throughout an icon image, or color-component pixel value specifications, such as when a specific hue-component source number is replaced with a specific hue-component replacement number throughout an icon image.

SUMMARY OF THE INVENTION

In general, the invention features systems and techniques relating to transformable user interface icons. According to an aspect, a machine-implemented technique involves receiving input indicating a change in functional context of a user interface, transforming an icon image based upon the input using a layer of the icon image, the icon image having multiple image layers including a transparency component, and compositing the multiple image layers using the transparency component to form a rendered icon with a changed appearance that reflects the changed functional context of the user interface.

Transforming the icon image can involve recoloring the layer with a new color that represents the changed functional context. Recoloring the layer can involve substituting a new hue component for an original hue component in the layer, and combining new and original brightness and saturation components in the layer. Combining new and original brightness and saturation components can involve setting a resulting brightness component equal to an original brightness component times a new brightness component plus the original brightness component reduced exponentially.

The technique can involve identifying the layer using layer type information included in the icon image. Transforming the layer of the icon image can involve copying the layer from the icon image during transformation, the transformed layer then being a transformed copy of the saved layer. Moreover, transforming the icon image can involve adding the layer to the icon image.

According to another aspect, a machine-implemented technique involves presenting a user interface element having a pictographic representation of a system component managed with a user interface, the pictographic representation including at least two sub-parts that at least partially overlap and blend together using smooth shading in the presented user interface element, and reflecting a change in state of the user interface element by recoloring at least one of the pictographic sub-parts of the pictographic representation at run time in the presented user interface element. The system component can be a system object in an operating system.

The system component can be a software tool, and the pictographic representation can be a pictographic representation of a semantic object that reflects how the software tool performs. The user interface element can be a button. The change in state can be a change in a color applied by the software tool. The change in state can be a new viewing context that indicates a relationship among multiple tools, including the software tool, in the user interface.

The systems and techniques of the invention can be implemented in a software product tangibly embodied in a machine-readable medium. Such a software product can include an icon image having multiple pictographic elements distributed among multiple layers of the icon image, and instructions operable to cause one or more data processing apparatus to perform operations comprising transforming at least one of the layers based upon received input, and rendering the icon image by compositing the layers. The software product can further include a user interface element of a software application, the user interface element being associated with the icon image and having at least two operational states in the software application. Moreover, transforming the at least one of the layers can involve transforming a layer based upon input indicating a new state of the user interface element in the software application.

The invention can be implemented to realize one or more of the following advantages. The icon image format of the invention provides significant flexibility in modifying an icon's appearance based on user actions. The icon image can be transformed dynamically at run time, and the types of available transformations can be readily updated in software. The icon image can eliminate traditional restrictions on shading and color mixing within an icon. Visually rich icons can undergo selective color replacement without sacrificing detail. Such visually rich icons can have high resolution, high color depth, and smooth shading and transparency effects. The smooth shading can be provided between multiple colors in an icon, both before and after a color replacement reflective of a change in state. Color replacement can be performed dynamically on any number of distinct, yet potentially overlapping pictographic regions within a rendered icon.

The details of one or more embodiments of the invention are set forth in the accompanying drawings and the descrip-

BRIEF DESCRIPTION OF THE DRAWINGS

Like reference symbols in the various drawings indicate like elements.

DETAILED DESCRIPTION

Figure 1:
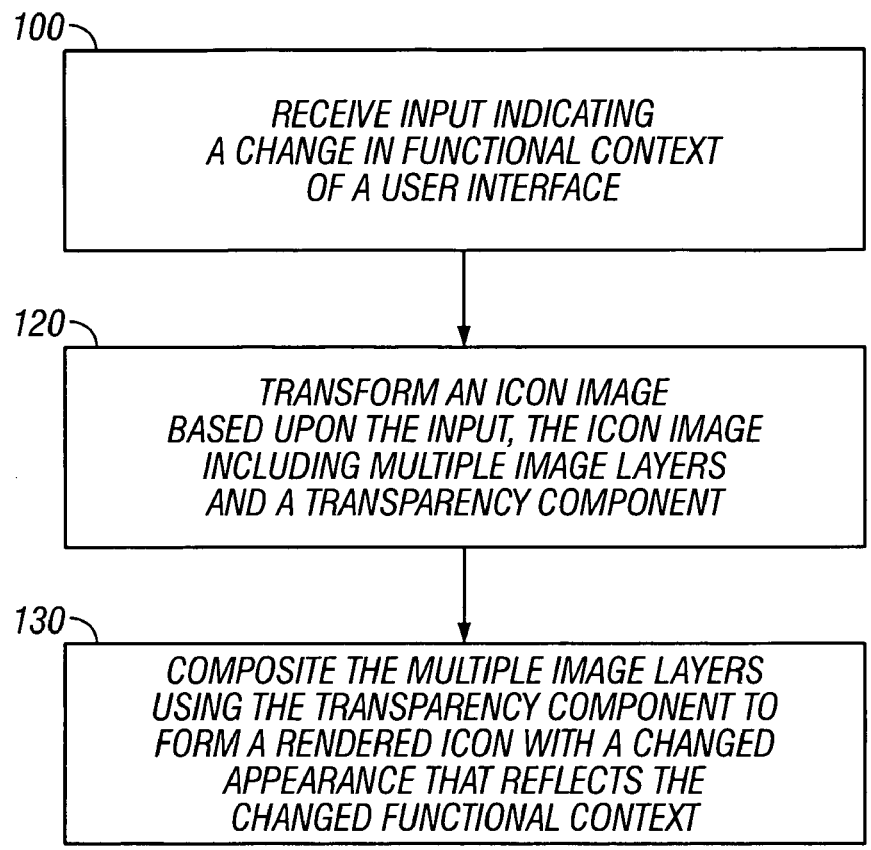
FIG. 1 is a flow chart illustrating transformation of an icon image in response to a change in a functional context of a user interface.

FIG. 1 is a flow chart illustrating transformation of an icon image in response to a change in a functional context of a user interface. Input indicating a change in functional context of a user interface is received at 100. The functional context of the user interface is the set of software functionality currently made immediately available through the user interface. For example, the user interface can include a selected paint brush tool in a drawing application, and the change to the functional context can be a change in the color to be applied by the paint brush tool. Moreover, the input can correspond to a user action performed with respect to a tool that can be represented by multiple icons in the user interface.

An icon image is transformed based upon the input at 120. The icon image includes multiple image layers with at least one transparency component, and the transformation of the image can involve transforming an existing layer and/or adding a new layer to the icon image. In general, this can be understood as applying a new image to the icon image to change the appearance of the icon image, such as to change the color of a pictographic sub-part of the icon or to change the pictographic sub-part itself (e.g., changing the shape of a pencil tip to correspond to the changing functionality of a pencil tool in a drawing application). Transformation of an image layer can involve recalculating pixel values throughout the image layer, including potentially recoloring the layer with a new color that represents the functional context (e.g., applying an image that is all one color, which corresponds to the color to be used by a drawing tool, to a layer of the icon image).

The multiple image layers are then composited using the transparency component to form a rendered icon with a changed appearance that reflects the functional context of the user interface. In this context, compositing image layers means making a new image to be presented by blending two or more overlapping image layers. The transparency component can be associated, at least in part, with the transformed layer, and the transparency component can be used to blend the transformed layer into the one or more other layers. The transparency component can be a transparency mask associated with only a single layer of the icon image (e.g., a one bit alpha for the layer), or the transparency component can be an alpha channel associated with all the layers (e.g., each layer can have its own transparency component providing eight bits of alpha per pixel). Compositing the layers of the icon image can be done using traditional multi-layer blending techniques.

Figure 2:
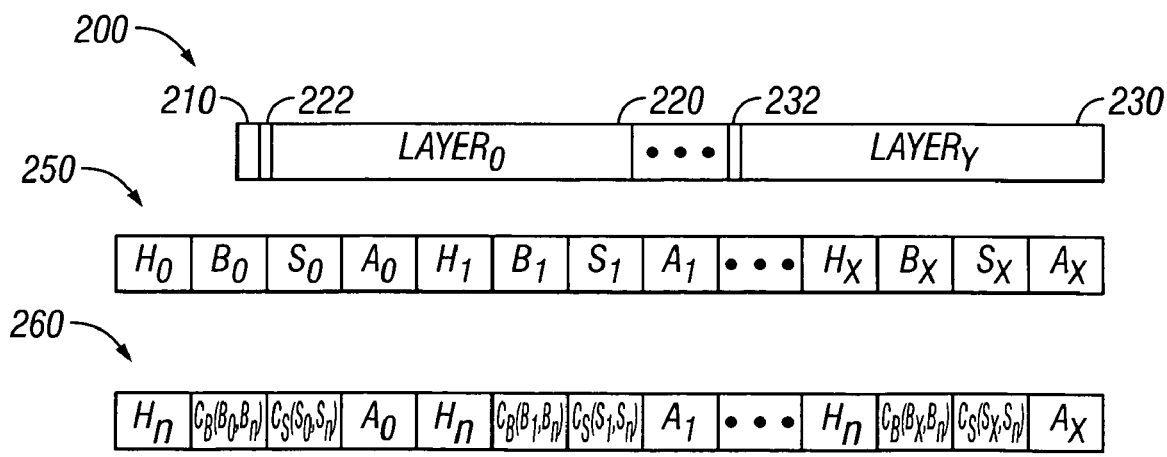
FIG. 2 is a block diagram illustrating an example approach to recoloring a layer of an icon image.

FIG. 2 is a block diagram illustrating an example approach to recoloring a layer of an icon image 200. The icon image 200 can include information 210 that indicates the total number of layers in the icon image 200, or this information can be partially or fully retained elsewhere. For example, the information 210 can be width and height information for the icon, plus information regarding the number and bit length of image components in an image layer; these two sets of information taken together with the size of the icon image 200 indicates the total number of layers 220, 230 in the icon image 200.

Identification of a layer to be transformed can be performed using layer type information 222, 232 associated with the layers 220, 230. For example, the layer type information 222, 232 can indicate which of the layers to transform in various functional contexts. Alternatively, such identification can be performed based upon information retained by the software implementing the transformation, including potentially a hard coded transformation of a predefined modification layer.

A layer 250, which has been selected from the icon image 200 to be recolored, can be processed in a hue-based color space. The icon image 200 can be stored in this color space or converted from a native color space (e.g., RGB) to the hue-based color space as needed. The hue-based color space is a perceptual color space designed to represent the way humans perceive color. Thus, a hue-based color space generally includes three components corresponding to an artist's concept of tint, shade, and tone. In this document, these three abstract image components are referred to as hue, saturation, and brightness components. Example color models that fall under the category of a hue-based color space include the HSV (Hue, Saturation, Value) and the HLS (Hue, Lightness, Saturation) color models.

The selected layer 250 can be recolored by substituting a hue component of a new color for the original hue components of the pixels in the selected layer 250, $$H_0 \ldots H_X \leftarrow H_n, \quad (1)$$

and combining brightness and saturation components of the new color with the original brightness and saturation components of the pixels in the selected layer 250, $$B_0 \ldots B_X \leftarrow C_B(B_0 \ldots B_X, B_n), \quad (2)$$

$$S_0 \ldots S_X \leftarrow C_S(S_0 \ldots S_X, S_n) \quad (3)$$

Additionally, the alpha components of the pixels in the selected layer 250, $A_0 \ldots A_X$, can be kept the same, resulting in a recolored layer 260.

Combining the brightness and saturation components can be done using any number of calculations, which can use varying levels of contribution from the new color and the original color. In general, the combination can be such that visual anomalies, which might otherwise be created by potential extremes in the recoloring (e.g., replacement with solid black), can be prevented. For example, the recoloring can involve setting a resulting brightness component equal to an original brightness component times a new brightness component plus the original brightness component reduced exponentially. In the HSV color space, this can translate into setting a resulting color according to the following equation:

$$(H_r, S_r, V_r) = (H_n, S_n \cdot S_s, V_n \cdot V_s + V_s^{20}), \quad (4)$$

where all the values for H, S, and V are normalized to be in the range of zero to one.

Figure 3:
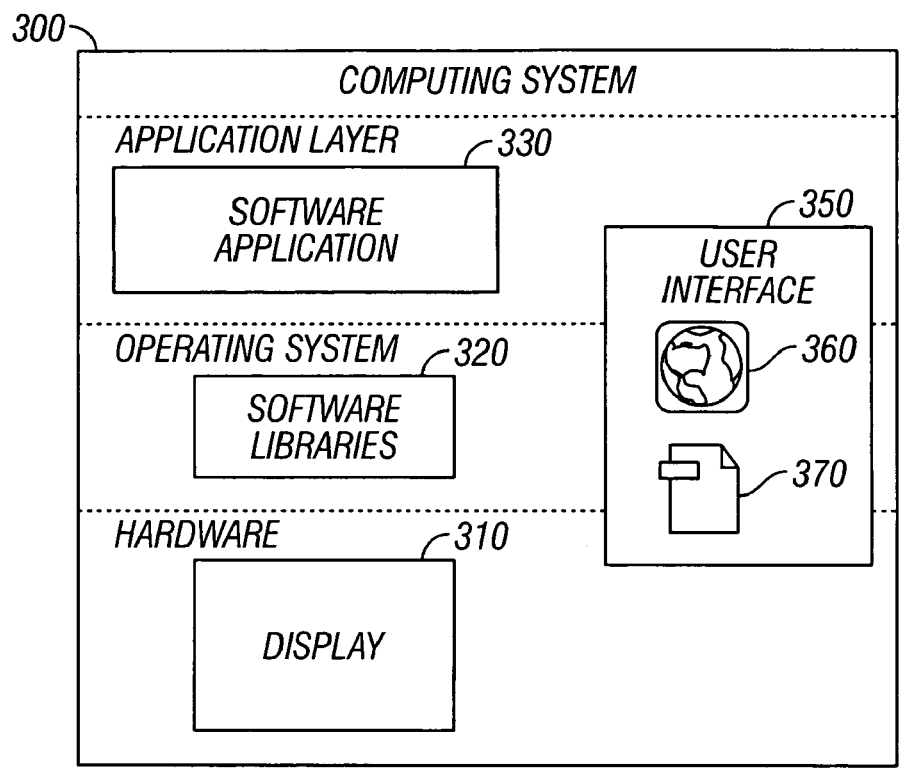
FIG. 3 is a block diagram illustrating a data processing system including one or more dynamically transformable user interface icons.

FIG. 3 is a block diagram illustrating a data processing system 300 including one or more dynamically transformable user interface icons 360, 370. The system 300 can be any machine having one or more processors, including a personal computer, a laptop computer, a personal digital assistant (PDA), a minicomputer, a handheld device, a mobile phone, and a special purpose programmable machine. In addition to the processor(s), the system 300 can include additional hardware, such as a display 310. The system 300 can include an operating system (OS) with one or more software libraries 320. The system 300 can also include a software application 330 in an application layer of the system 300. For example, the application 330 can be the ADOBE ACROBAT® software provided by Adobe Systems Incorporated of San Jose, Calif.

The system 300 includes a user interface 350 with one or more dynamically transformable user interface icons 360, 370. The user interface 350 can be a product of the OS and/or of the software application 330. The user interface icons 360, 370 are visual portions of user interface elements included in the user interface 350. For example, the icon 360 can be part of a button in a toolbar in the software application 330; the icon 370 can be part of an object, folder, or program representation in the OS.

The icons 360, 370 are derived from saved icon images in which different pieces of an icon exist on different layers, allowing the different pieces of the icon to be processed individually. The different pieces of an icon can be sub-parts of a larger pictographic representation, where the sub-parts overlap and blend together using smooth shading. For example, the globe icon shown has green land on blue water, and where land and water meet, colors that are some combination of blue and green are common. As used herein, the term "smooth shading" refers to shading for an object in which a shading model is used to place color in a two dimensional region, while a color model is used to define the range of colors to be applied in the shading. For additional details regarding smooth shading, see U.S. Pat. Nos. 6,271,861 (entitled SMOOTH SHADING OF AN OBJECT, and issued Aug. 7, 2001) and 6,313,840 (entitled SMOOTH SHADING OF OBJECTS ON DISPLAY DEVICES, and issued Nov. 6, 2001), which are both hereby incorporated by reference. Thus, in the example icon image, the water portion of the icon can be placed on one layer and the land portion on another, and where the two meet (in the flattened icon), an alpha component of the land layer can allow some of the underlying water layer to bleed in, where the water and land both use smooth shading. Because the pictographic sub-parts of the icon are placed on separate layers in the saved icon image, each pictographic sub-part can be separately transformed. For example, each pictographic sub-part can be separately recolored within its own layer of the icon image.

Figure 4:
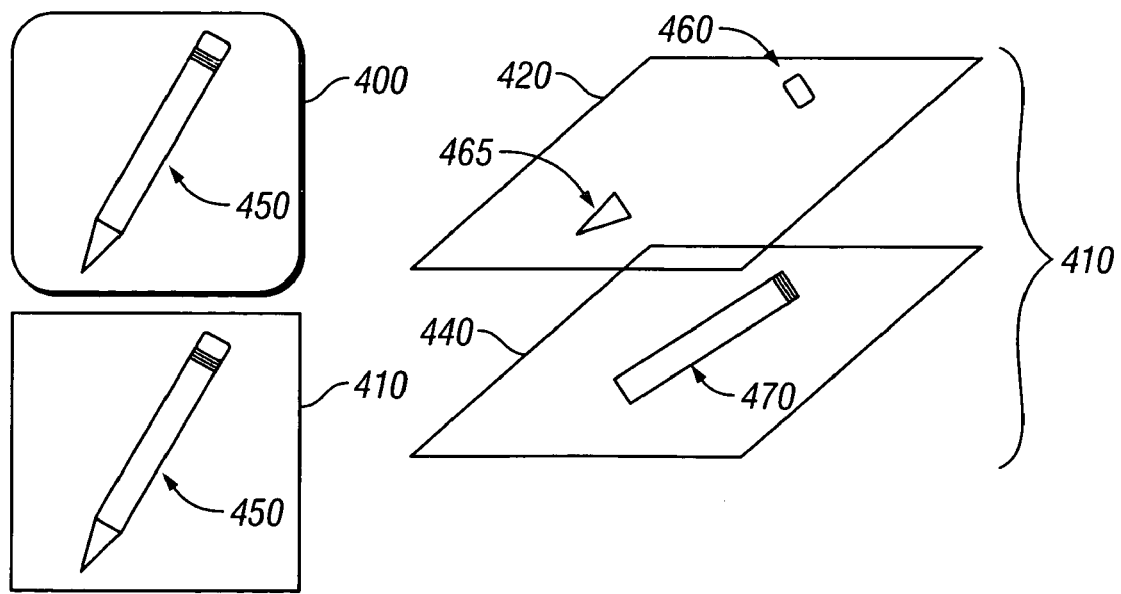
FIG. 4 is a block diagram illustrating an example icon and corresponding icon image.

FIG. 4 is a block diagram illustrating an example icon 400 and corresponding icon image 410. The icon 400 is a pencil tool icon as presented in a user interface. The icon image 410 is the source image data saved in memory/storage and rendered to produce the flattened icon 400. The icon image 410 includes a pictographic representation 450 of a semantic object that reflects a software tool that performs indicative of the semantic object (i.e., a picture of a pencil for a pencil tool). The pictographic representation 450 has sub-parts placed on separate layers in the icon image. In this example, a pencil shaft 470 is placed in a first layer 440, and an eraser 460 and a pencil tip 465 are placed in a second layer 420. The entire pencil shaft 470 can thus be recolored independently of the other picture elements 460, 465 and without doing any color identification to distinguish the shaft from the eraser or tip. If the picture elements 460, 465 are to be recolored independently of each other, this can be accomplished by moving one of the picture elements 460, 465 to a new layer for the icon image 410.

Moreover, the shaft 470 can be dynamically recolored while maintaining high color depth, and smooth shading and transparency effects within the resulting icon. The shaft 470 can include a wide range of colors, and a new color can be calculated for each pixel in the layer 440. This can involve replacing hue components and calculating brightness and saturation components, as described above. Alternatively, a more complex color transformation can be used, such as calculating a new hue component for a pixel based on the original hue component, a new hue component, and an average of original hue components in the layer 440.

Recoloring the shaft 470 can involve copying the layer 440 during the recoloring. The icon image 410 can be stored in memory, and when it comes time to recolor a layer, that layer can be copied from memory and recolored at the same time. Then, the recolored layer and the remaining layers can be composited into a resulting flattened image (e.g., a bitmap) used in the icon 400. By not directly recoloring the source image 410, accumulated rounding errors can be prevented. Moreover, the flattened image can also include a transparency component, allowing the icon 400, as presented in a user interface, to include features of a background as specified by the OS.

Figure 5:
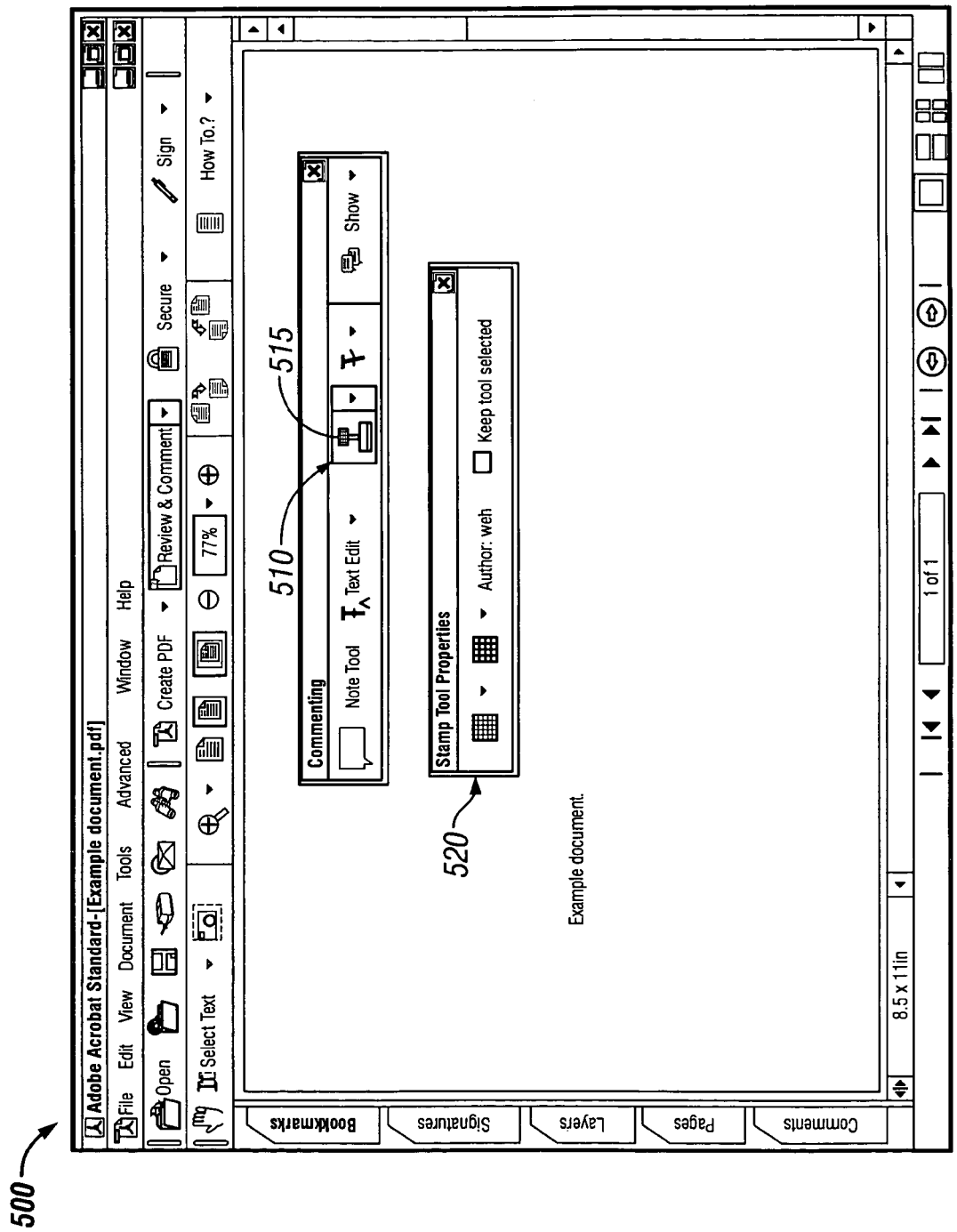
FIGS. 5-7 illustrate an example software application user interface.
Figure 6:
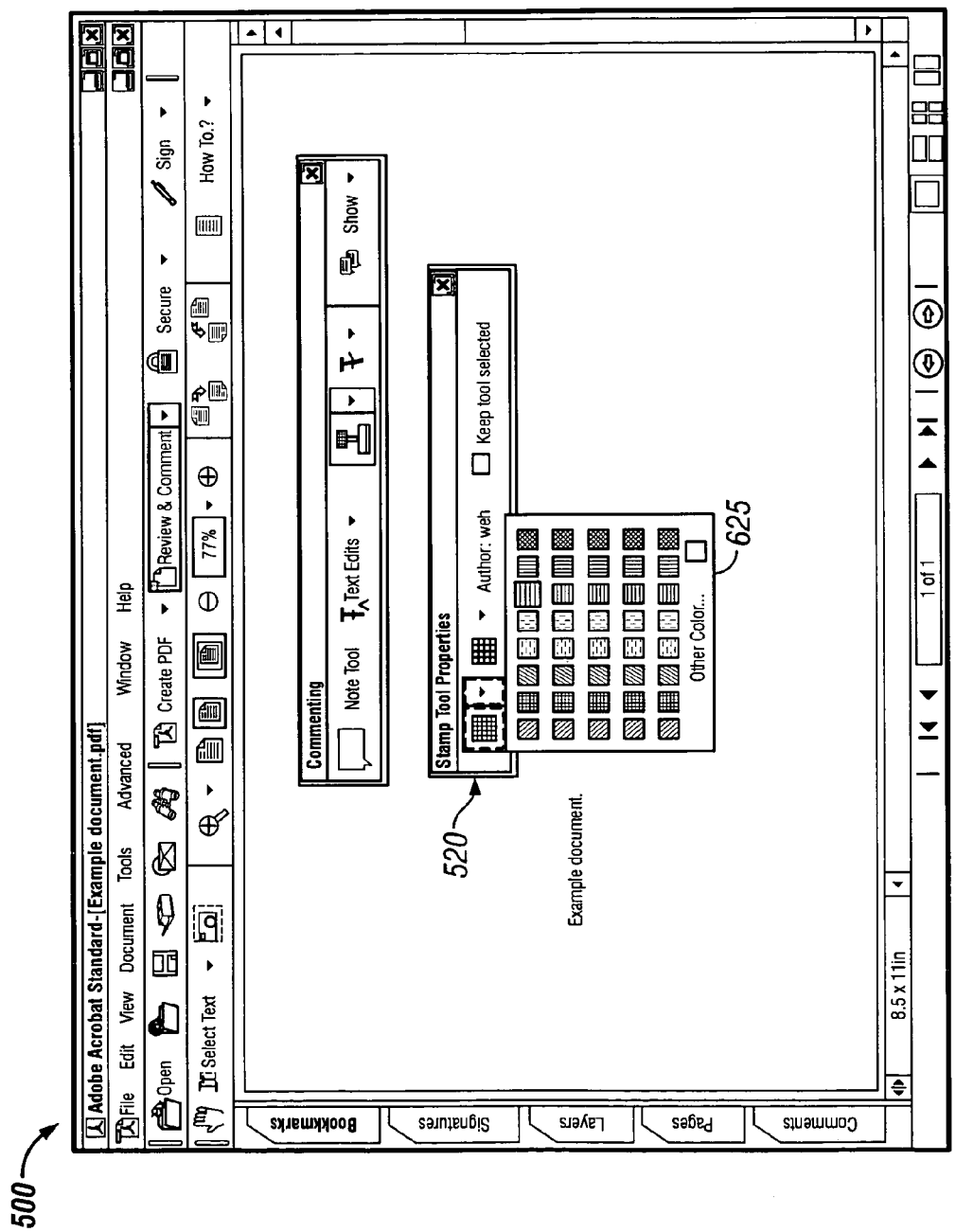
Figure 7:
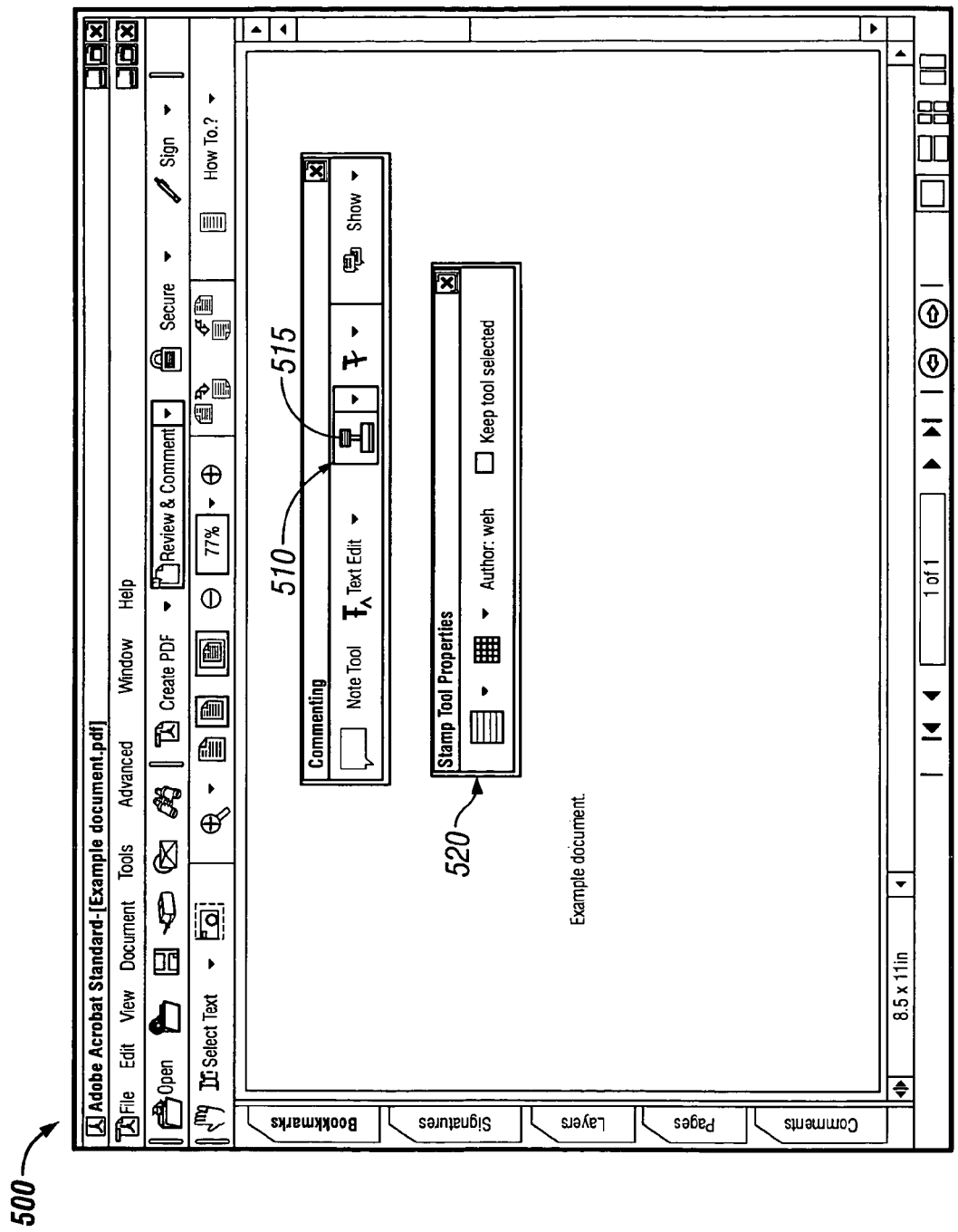

FIGS. 5-7 illustrate an example software application user interface 500. The application user interface 500 includes a user interface element 510 with a dynamically transformable icon 515 that represents a stamp tool in the ADOBE ACROBATS software. The icon image corresponding to the flattened icon 515 includes two layers: a first layer having the stamp body, and a second layer having the stamp handle. The color of the icon 515 can be changed using another user interface element 520.

FIG. 6 illustrates how the user interface element 520 provides a drop down menu 625 that can be used to select a color. As shown, a new color, navy blue, is being selected to replace the original color, yellow. FIG. 7 illustrates the changed icon 515 after selection of the new color: the yellow handle has been replaced with a navy blue handle. Recoloring of the icon 515 can be performed whenever the user interface element 510 decides it needs to be refreshed, which can be when the screen is refreshed and/or when the user interface element 510 receives a message that its color has changed. On each refresh, the layer can be copied and recolored, as described above, and a new bitmap image can be generated. The software application can include software infrastructure to handle the layers every time an icon is drawn, including infrastructure used to pump colors, and potentially layer identification information, around the system. For example, the software application can include a repository of color information for user interface elements corresponding to various tools in the application, the message sent to the user interface element 510 can indicate that some change has occurred that necessitates a redraw, and the user interface element can then obtain its new color information from the repository.

A color applied to an icon can represent the color to be used with a corresponding tool, or the color can represent something else. A common color can be applied to the icons corresponding to multiple system components (e.g., application tools or system objects in the OS) in order to show associations between the various system components. The applied color can be used as a visual learning cue for indicating tool functionality. For example, a user can toggle a viewing mode to show all art creation tools, or tools that affect color, or tools that edit paths. Thus, color can be used to indicate context-sensitive relationships among tools without changing tool locations in a user interface.

The invention and all of the functional operations described in this specification can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the operations of the invention can be performed in a different order and still achieve desirable results. Moreover, an icon image can be transformed using combinations of layer additions and/or layer changes. For example, a pencil tool can include multiple types of tips (e.g., straight, calligraphy), each tip can have an associated layer, and a change in the tool's drawing state causes all but one of the layers with pencil tips to be changed to fully transparent, or otherwise unselected during compositing.

What is claimed is:

1. A machine-implemented method comprising:
   receiving input indicating a change in functional context of a user interface;
   transforming an icon image based upon the input, wherein transforming the icon image comprises transforming data contained within an existing layer of multiple image layers of the icon image, the icon image comprising the multiple image layers including a transparency component, each layer comprising multiple components each having a corresponding data set within such layer, and the icon image comprising information indicating a total number of the multiple image layers in the icon image; and
   compositing the multiple image layers using the transparency component to form a rendered icon with a changed appearance that reflects the changed functional context of the user interface.

2. The method of claim 1, wherein transforming the data contained within the existing layer comprises recoloring the layer with a new color that represents the changed functional context, the recoloring comprising applying different modifications to different components of the existing layer, wherein at least one of the different modifications comprises a function of original data contained within a corresponding component of the existing layer before modification.

3. The method of claim 2, further comprising identifying the layer using layer type information included in the icon image.

4. The method of claim 2, wherein the transparency component comprises an alpha component for each layer.

5. The method of claim 2, wherein transforming the data contained within the existing layer comprises copying the existing layer from the icon image during transformation, the transformed layer comprising a transformed copy of the layer.

6. The method of claim 2, wherein receiving the input comprises receiving input indicating a change in a user interface element.

7. The method of claim 6, wherein the user interface element comprises a button that corresponds to a software tool.

8. A machine-implemented method comprising:
   receiving input indicating a change in functional context of a user interface;
   transforming an icon image based upon the input using a layer of the icon image, the icon image comprising multiple image layers including a transparency component; and
   compositing the multiple image layers using the transparency component to form a rendered icon with a changed appearance that reflects the changed functional context of the user interface; wherein transforming the icon image comprises recoloring the layer with a new color that represents the changed functional context, and recoloring the layer comprises:
   substituting a new hue component for an original hue component in the layer; and
   combining new and original brightness and saturation components in the layer.

9. The method of claim 8, wherein combining new and original brightness and saturation components comprises setting a resulting brightness component equal to an original brightness component times a new brightness component plus the original brightness component reduced exponentially.

10. The method of claim 9, wherein recoloring the layer occurs in a hue-saturation-value (HSV) color space and further comprises setting a resulting color according to $(H_r, S_r, V_r) = (H_n, S_n \cdot S_s, V_n \cdot V_s + V_s^{20})$.

11. A software product tangibly embodied in a machine-readable medium, the software product comprising instructions operable to cause one or more data processing apparatus to perform operations comprising:

receiving input indicating a change in functional context of a user interface;

transforming an icon image based upon the input, wherein transforming the icon image comprises transforming data contained within an existing layer of multiple image layers of the icon image, the icon image comprising the multiple image layers including a transparency component, each layer comprising multiple components each having a corresponding data set within such layer, and the icon image comprising information indicating a total number of the multiple image layers in the icon image; and compositing the multiple image layers using the transparency component to form a rendered icon with a changed appearance that reflects the changed functional context of the user interface.

12. The software product of claim 11, wherein transforming the data contained within the existing layer comprises recoloring the layer with a new color that represents the changed functional context, the recoloring comprising applying different modifications to different components of the existing layer, wherein at least one of the different modifications comprises a function of original data contained within a corresponding component of the existing layer before modification.

13. The software product of claim 12, wherein the operations further comprise identifying the layer using layer type information included in the icon image.

14. The software product of claim 12, wherein the transparency component comprises an alpha component for each layer.

15. The software product of claim 12, wherein transforming the data contained within the existing layer comprises copying the existing layer from the icon image during transformation, the transformed layer comprising a transformed copy of the layer.

16. The software product of claim 12, wherein receiving the input comprises receiving input indicating a change in a user interface element.

17. The software product of claim 16, wherein the user interface element comprises a button that corresponds to a software tool.

18. A software product tangibly embodied in a machine-readable medium, the software product comprising instructions operable to cause one or more data processing apparatus to perform operations comprising:

receiving input indicating a change in functional context of a user interface;

transforming an icon image based upon the input using a layer of the icon image, the icon image comprising multiple image layers including a transparency component; and compositing the multiple image layers using the transparency component to form a rendered icon with a changed appearance that reflects the changed functional context of the user interface; wherein transforming the icon image comprises recoloring the layer with a new color that represents the changed functional context, and recoloring the layer comprises:

substituting a new hue component for an original hue component in the layer; and combining new and original brightness and saturation components in the layer.

19. The software product of claim 18, wherein combining new and original brightness and saturation components comprises setting a resulting brightness component equal to an original brightness component times a new brightness component plus the original brightness component reduced exponentially.

20. The software product of claim 19, wherein recoloring the layer occurs in a hue-saturation-value (HSV) color space and further comprises setting a resulting color according to $(H_r, S_r, V_r) = (H_n, S_n \cdot S_s, V_n \cdot V_s + V_s^{20})$.

21. A system comprising:

a display that presents at least a portion of a user interface including a high color depth icon with smooth shading and transparency effects; and software means for modifying at least one existing layer of an icon image comprising multiple layers by transforming data contained within the at least one existing layer, at run time and in response to a change in state, each layer comprising multiple components each having a corresponding data set within such layer, and the icon image comprising information indicating a total number of the multiple layers in the icon image; and software means for rending the icon image into the high color depth icon with the at least one modified layer affecting a change in appearance of the high color depth icon.

22. The system of claim 21, wherein the software means for modifying the at least one existing layer comprises means for recoloring an existing layer by applying different modifications to different components of the existing layer, wherein at least one of the different modifications comprises a function of original data contained within a corresponding component of the existing layer before modification.

* * * * *

UNITED STATES PATENT AND TRADEMARK OFFICE
CERTIFICATE OF CORRECTION

PATENT NO.       : 7,573,487 B1                                    Page 1 of 1
APPLICATION NO.  : 10/742257
DATED            : August 11, 2009
INVENTOR(S)      : Scott E. Petersen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 178 days.

Signed and Sealed this

Seventh Day of September, 2010

David J. Kappos
*Director of the United States Patent and Trademark Office*